United States Patent
Hogeboom

(10) Patent No.: US 7,061,938 B2
(45) Date of Patent: Jun. 13, 2006

(54) PARALLEL DATA BUS INTEGRATED CLOCKING AND CONTROL

(75) Inventor: John Gordon Hogeboom, Nepean (CA)

(73) Assignee: Nortel Networks Limited, Nepean (CA)

( * ) Notice: Subject to any disclaimer, the term of this patent is extended or adjusted under 35 U.S.C. 154(b) by 1103 days.

(21) Appl. No.: 09/875,202

(22) Filed: Jun. 7, 2001

(65) Prior Publication Data

US 2001/0055301 A1    Dec. 27, 2001

Related U.S. Application Data

(60) Division of application No. 09/002,113, filed on Dec. 31, 1997, now Pat. No. 6,262,998, which is a continuation-in-part of application No. 08/997,777, filed on Dec. 24, 1997, now abandoned.

(51) Int. Cl.
   *H04J 3/00*    (2006.01)
(52) U.S. Cl. ......................... 370/503; 375/354
(58) Field of Classification Search ................ 370/530, 370/509, 520, 489, 438; 375/354, 362, 239, 375/539, 360–376; 710/61
See application file for complete search history.

(56) References Cited

U.S. PATENT DOCUMENTS

| | | | |
|---|---|---|---|
| 3,925,762 A | | 12/1975 | Heitlinger et al. |
| 4,972,161 A | | 11/1990 | Davies et al. |
| 5,140,611 A | | 8/1992 | Jones et al. |
| 5,513,377 A | * | 4/1996 | Capowski et al. ............ 710/61 |
| 5,522,088 A | * | 5/1996 | Halma et al. ................. 710/61 |
| 5,568,526 A | | 10/1996 | Ferraiolo et al. |
| 5,598,442 A | * | 1/1997 | Gregg et al. ................. 375/354 |
| 5,623,644 A | * | 4/1997 | Self et al. .................... 713/503 |
| 5,634,043 A | * | 5/1997 | Self et al. .................... 713/503 |
| 5,651,033 A | * | 7/1997 | Gregg et al. ................. 375/354 |

* cited by examiner

*Primary Examiner*—Frank Duong

(57) ABSTRACT

A data bus is provided having both a synchronous clock and a channel of data control information integrated in a single signal path. For a data bus having a particular bit time, the integrated clock and control signal has clock high and low time in units equal to one bit time. One edge of the integrated clock and control signal is fixed in phase for bit timing; the alternate edge is phase-modulated. The phase-modulated clock edge carries framing and control data. The fixed-phase bit-timing edge regulates a DLL or PLL to extend the timing. The clock rate is preferably chosen to be equal to the multiplexing cycle rate of multiplexed data carried on the parallel bus.

12 Claims, 2 Drawing Sheets

PARALLEL DATA BUS INTEGRATED CLOCKING AND CONTROL

This is a divisional of application Ser. No. 09/002,113 filed Dec. 31, 1997, now U.S. Pat. No. 6,262,998 which is a continuation-in-part of application Ser. No. 08/997,777 filed Dec. 24, 1997 now abandoned.

FIELD OF THE INVENTION

This invention relates generally to data transmission, and more particularly to a high-speed data bus having integrated clock and control signal information carried by a single channel.

BACKGROUND OF THE INVENTION

High-speed data communication systems have a need for improved maintenance of primary clock timing and synchronization of data carried by high-speed data buses.

DESCRIPTION OF THE RELATED ART

In high-speed data communications, in which the duration of data bits is of the same order or smaller than uncertainties in their propagation time, it is necessary to generate a clock signal that is synchronized to the data, in order to accurately regenerate the bit stream at the receiving end of each data link. When serial data paths are involved, a separate clock path running parallel to the data path is usually considered to be excessive in overhead. It is more common to increase the data rate of the serial data path by 12% to 25%, for example, so that the original bit stream can be encoded to provide an increased and guaranteed-minimum number of transitions to which a clock signal can be reliably phase-locked. The phase-locked loop (PLL) needed for such clock signal generation is complicated by the need to handle a randomly variable number of missing transitions while remaining immune to locking at fractional ratios of the bit frequency.

For parallel data signal paths, which are employed to further increase data rate, a parallel clock path usually represents the least overhead because this arrangement simplifies clock signal regeneration and the clock information is shared by all of the parallel data signals, each of which can carry data at its full bit rate without any data encoding. It may often be necessary, however, to provide means to individually adjust the phase of each data path relative to the clock signal in order to correct for signal path differences among the data paths, such as different wiring lengths or different interface delays. When there are several data sources, in order to control individual phase settings of this type in a cooperative manner, it is necessary to provide a control data channel that is separate from the data signals to be controlled. In addition to such control data, it is often required to carry lower data-rate information, such as framing information. The parallel data bus may carry multiplexed data requiring de-multiplexing with re-synchronisation.

Thus, in both serial and parallel data transmission, there is often a need to transmit both synchronous clock signals and control data, and there is often a need for synchronizing multiplexed data carried on a high-speed data bus.

PROBLEMS SOLVED BY THE INVENTION

With respect to high-speed data buses, the use of multiple signal paths for synchronous clocks, control data, and framing data has added cost to data transmission equipment. In some cases, it has been necessary to increase data rates in order to transmit control and clock synchronizing information, thus further increasing cost. These shortcomings of the background art may be avoided by use of the present invention.

PURPOSES, OBJECTS, AND ADVANTAGES OF THE INVENTION

The purpose of the invention is a more efficient high-speed parallel data bus having a single integrated signal path carrying both synchronous clock information and control data. A general object of the invention is enabling a high-speed parallel data bus to be implemented in a more compact and flexible manner than heretofore, while achieving the maximum speed capability and/or maximum margins for a given speed requirement. Another object is an improved re-synchronization of multiplexed data. Overall objects include reducing costs and risks in development of high-speed data buses. Finally, an important object is providing an efficient means of achieving both a synchronous clock and a control data channel integrated in a single signal path used with a high-speed parallel data bus.

SUMMARY OF THE INVENTION

A clock is always needed with transmitted data in order to define the position of individual bits in the data sequences. If the clock signal is directly transmitted, such a clock signal may require special handling, e.g. the use of higher-speed interfaces than those used by the data channels. In this invention the clock signal is transmitted at a lower rate, and only a primary edge (for example, the falling edge) is used to control the timing of a PLL or DLL, which can then regenerate all required equal- or higher-rate clocks with required stability and phase relations. By using only timing increments of one bit time for the clock signal high and low periods, the same transmission media and interfaces may be used for the clock as are normally used for the associated data stream or streams. Furthermore, the alternate edge of the signal is independently modulated in increments of one data bit time to carry control data. Control data transmitted in this way, integrated with the clock signal, may be used for any purpose, including specific low-speed timing purposes often called framing. At the same time, and in the same manner, such control data can be used in a process of adjusting or "trimming" delays of data from two or more sources multiplexed onto a data line. At the receiving end of the bus, the delays are adjusted in accordance with the control data, so that the various multiplexed data streams will align with each other in time at data receivers used to recover the bit streams. One clock signal may be used in these ways for many parallel data lines, which may differ from one another, and which may also require unique timing settings. The clock signal is an ideal signal to carry such control data, since it must already connect to all transmitters and receivers, and because it directly provides the timing information needed to optimally recover the data it carries.

Thus, a data bus is provided having both a synchronous clock and a channel of data control information integrated in a single signal path. For a data bus having a particular bit time, the integrated clock and control signal has clock signal high and low time in units equal to one bit time. One edge of the integrated clock and control signal is fixed in phase for bit timing; the alternate edge is phase-modulated. The phase-modulated clock edge carries framing and control data. The fixed-phase bit-timing edge regulates a DLL or PLL to extend the timing. The clock rate is preferably chosen to be equal to the multiplexing cycle rate of multiplexed data carried on the parallel bus.

DETAILED DESCRIPTION OF THE PREFERRED EMBODIMENTS

Figure 2:
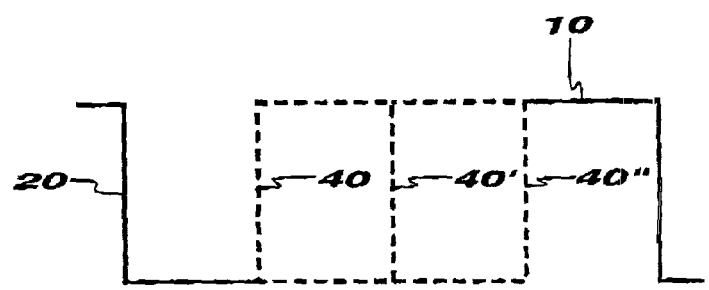
FIG. 2 shows an example of a second waveform of an integrated clock and control signal.
Figure 3:
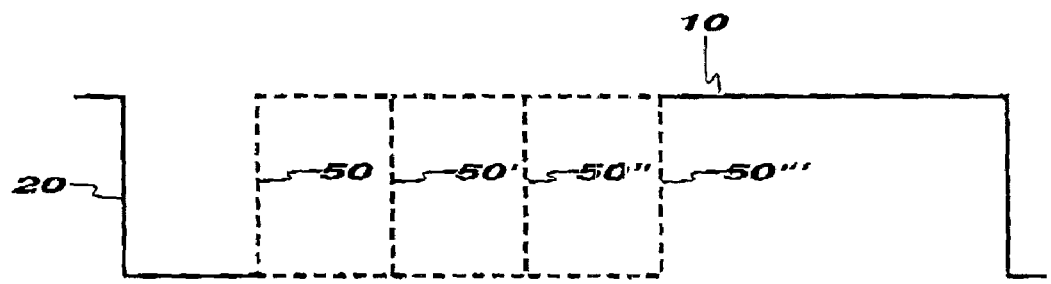
FIG. 3 shows an example of a third waveform of an integrated clock and control signal.

This detailed description describes a parallel high-speed bus clocking arrangement providing an efficient integrated means of achieving both synchronous clock Signals and a control data channel. Drawing FIGS. 1–3 illustrate waveforms showing various aspects of this arrangement.

In order to allow maximum data rate, optimum matching between clock and data, and avoidance of special wiring or interfaces, the clock signal in the present high speed clock-with-data communication scheme consists of high and low periods in integer units of bit time. This implies that the clock frequency $f_c$ must be the data bit frequency $f_d$ divided by an integer of two or more, i.e. $f_c = f_d/n$ ($n \geq 2$), which in turn requires that some means such as a delay-locked loop (DLL) or a phase-locked loop (PLL) must be used to generate a full bit-rate clock or multiple phases separated by one bit time. The same means are also generally useful for producing the fractional-width time phases or delays needed to adjust the previously mentioned clock vs. data phasing.

This invention allows use of a single signal path in addition to the parallel data paths. The single additional signal path, which is no different from those used for parallel data, is used to carry all timing information, such as bit timing, control information which may be used to optimize the timing of each bit stream, and other lower rate timing pulses (often called "framing"). Only one edge of the clock signal is used for bit timing by acting as the frequency and phase reference for a DLL or PLL, which produces multiple phases as needed and can regulate other delays needed for optimum sampling of the parallel data. The one edge of the signal used for bit timing has fixed phase. This edge is denoted as the primary edge. The control and framing information is communicated by moving the phase position of the alternate or non-timing edge at the clock signal in increments of one bit time so that it can be treated in all respects like the other data signals. That is, the alternate or non-timing edge is phase-modulated in increments of one bit time. Hence, the clock frequency must not exceed one-third (⅓) of the data rate and is typically one-fourth (¼) or one-eighth (⅛) of that data rate. More generally, the clock rate equals the data rate divided by n, where n is an integer greater than two.

Figure 1:
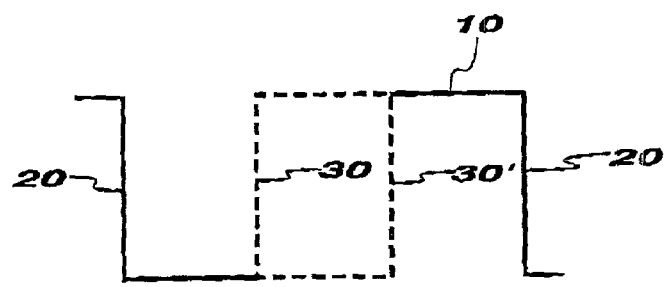
FIG. 1 shows an example of a waveform of an integrated clock and control signal made in accordance with the invention.

FIG. 1 shows an example of such a signal waveform 10, for the case n=3 in which the first edge 20 having fixed phase provides bit timing, and the second edge 30 is phase-modulated (30, 30') to transmit the control and framing information. If n=3, there can be just two edge positions (30, 30') to give a simple binary channel. The two signaling states provide 1 bit of information. While the example of FIG. 1 uses the first (falling) edge as the fixed-phase primary edge carrying bit-timing and the second (rising) edge as the phase-modulated alternate edge, it will be clear to those skilled in the art that these choices may be changed without interfering with the principle of operation of the invention.

With n=4, as shown in FIG. 2 the three edge positions available (40, 40', 40") can be used to give two distinguishable data types, one of which might be used for framing while the other might be used for interactive control. In this case, the three signaling states are equivalent to 1.5 bits of information. Similarly, FIG. 3 illustrates a waveform with n=8, where the first edge 20, with fixed phase, again carries the bit timing, and the phase-modulated second or alternate edge (50, 50', 50", 50''') can carry the control and/or framing information. In the case shown in FIG. 3, the four possible states convey two bits. It is important to note that information carried by the position of the alternate clock edge is not subject to the phase alignment uncertainties of the other data signals of the parallel bus because it is intrinsically aligned to the reference timing edge 20.

Commonly, it is necessary to reduce the high data rate used for communication to a lower rate more compatible with integrated data buffers or other data processing. The data rate is reduced by rate multiplexing. The multi-phase scheme mentioned above can simplify such rate multiplexing. By choosing the value of n to be equal to the multiplexing factor, the external and internal clock rates become equal so that no frequency division is needed, and so that each primary clock phase from the DLL or PLL is intrinsically associated with one unique lower rate bit stream. Of course it is also possible to choose other frequency ratios, in which case they would normally be kept simple for ease of implementation, with the frame pulse capability controlling phasing of this and other lower rate clocks as needed.

Thus, the synchronous clock and a channel of data control and/or framing information are integrated into a single signal path. One aspect of the invention is that, for a parallel data bus having a particular bit time, the integrated clock and control signal has clock high and low time in units equal to one bit time. In another aspect of the invention, one edge of the integrated clock and control signal is fixed in phase for bit timing; the alternate edge is phase-modulated. The phase-modulated edge carries framing and/or control data. The fixed-phase bit-timing edge regulates a DLL or PLL to extend the clock signal synchronization. The clock rate is preferably chosen to be equal to the multiplexing cycle rate of multiplexed data carried on the parallel bus. The maximum clock rate is equal to the data bit rate divided by three; typically, the clock rate would be chosen to be equal to the data bit rate divided by four or by eight.

Figure 4:
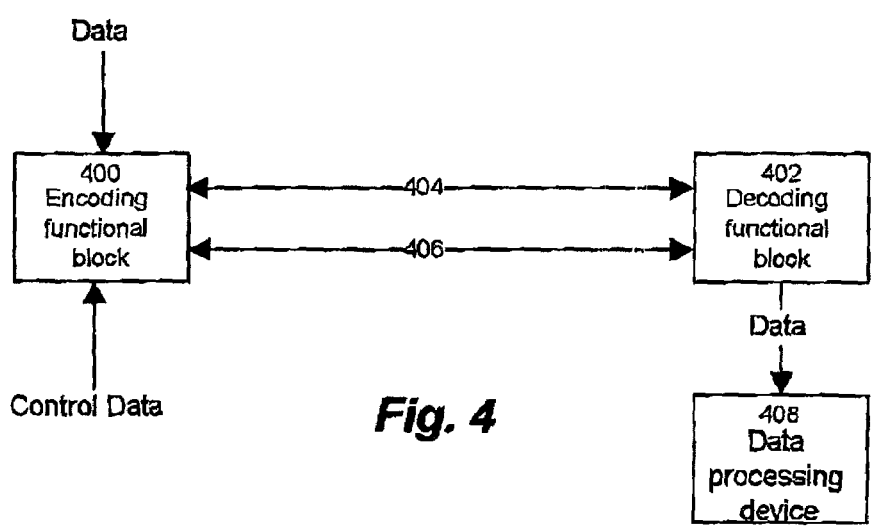
FIG. 4 illustrates a block diagram of the high speed bus structure, in accordance with an example of implementation of the present invention.

FIG. 4 of the annexed drawings illustrates one possible implementation of the high speed data bus structure in accordance with the present invention. The high speed data bus structure includes an encoder functional block 400 that receives the data along with the control information to be transmitted. The encoder functional block transmits the data over the pathway 404 that can be a cable, optical fiber or the air interface (for RF transmissions). The encoder functional block 400 also generates the clock information and combines the clock information with the control data, as described above, that is transmitted over the pathway 406. The pathway 406 can be a cable, optical fiber or the air interface (for RF transmissions). A decoder functional block 402 receives both signals. In the example shown, the data that travels over the pathway 404 is directed to any suitable data processing device 408. The decoder functional block 402 receives the composite signal traveling over the pathway 406 and proceeds to extract the clock information and the control data from this composite signal, in accordance with the signal encoding protocol described earlier. The structure of the encoding functional block 400 and the structure of the decoding functional block may widely vary in accordance with the intended application. Most preferably those components are realized in hardware and comprise logic gates necessary to provide the intended functionality. It is not deemed necessary to provide additional details regarding these components as their construction is well within the reach of a man skilled in the art.

INDUSTRIAL APPLICABILITY

The invention has many industrial applications. For use in high-speed data communications, a parallel high-speed-bus clocking arrangement provides an efficient integrated means of achieving both synchronous clock signals and control data transmission in a single channel. With multiplexed data carried on the parallel bus, the clock rate may be made equal to the multiplexing cycle rate, thus providing simplification.

Other embodiments of the invention will be apparent to those skilled in the art from a consideration of this specification or from practice of the invention disclosed herein. For example, if many clocks require separate synchronization, or if timing optimization for a very large number of parallel data channels is required, a plurality of integrated channels may be used, partitioned according to the application, each integrated clock/control channel carrying clock, control, and/or framing information. It is intended that the specification and examples be considered as exemplary only, with the true scope and spirit of the invention being defined by the following claims and their legal equivalents.

The invention claimed is:

1. A data communication system, comprising:
   a) a first input for receiving data, said data being characterized by a bit time;
   b) a second input for receiving data control information;
   c) an encoder unit coupled to said first and second inputs, said encoder unit operative to:
      i) generate clock information;
      ii) process said clock information and said data control information for generating a clock and control signal, said clock and control signal having high and low times in units equal to one said bit time, said clock and control signal being characterized by first and second edges, said first edge having fixed phase and said second edge being phase-modulated;
   d) at least one data channel; and
   e) a clocking and control channel, said encoder unit operative to transmit said data over said at least one data channel and to transmit said clock and control signal over said clocking and control channel.

2. A data communication system as defined in claim 1, wherein said clocking and control channel is characterized by a clock rate and said at least one data channel carries data multiplexed at a multiplexing cycle rate, said clock rate being substantially equal to said multiplexing cycle rate.

3. A data communication system as defined in claim 1, wherein said first edge carries bit timing information for clock synchronization.

4. A data communication system as defined in claim 1, wherein said second edge carries at least data control information.

5. A data communication system as defined in claim 1, wherein said second edge carries at least data framing data.

6. A data communication system as defined in claim 1, wherein said second edge carries data control information and framing data.

7. A data communication system as defined in claim 1, wherein said data communication system further comprises:
   a) a decoder unit for receiving data and the clock and control signal over said data channel and said clocking and control channel, respectively, said decoder unit operative to:
      i) extract from said clock and control signal said clock information and said data control information;
      ii) process said data on a basis of said clock information and said data control information for generating a data signal;
   b) an output for releasing said data signal to a data processing device.

8. A data communication system as defined in claim 7, wherein said data channel is selected from the group consisting of a cable, an optical fiber and an air interface.

9. A data communication system as defined in claim 7, wherein said clocking and control channel is selected from the group consisting of a cable, an optical fiber and an air interface.

10. An encoder for use in a data communication system, said encoder connected to at least one data channel and a clocking and control channel, said encoder comprising:
    a) a first input for receiving data, said data being characterized by a bit time;
    b) a second input for receiving data control information;
    c) a processing unit operative to:
       i) generate clock information;
       ii) process said clock information and said data control information for generating a clock and control signal, said clock and control signal having high and low times in units equal to one said bit time, said clock and control signal being characterized by first and second edges, said first edge having fixed phase and said second edge being phase-modulated;
    d) a first output for transmitting said data over the at least one data channel;
    e) a second output for transmitting said clock and control signal over the clocking and control channel.

11. A decoder for use in a data communication system, said decoder connected to at least one data channel and a clocking and control channel, said decoder comprising:
    a) a first input for receiving data over the at least one data channel, said data being characterized by a bit time;
    b) a second input for receiving a clock and control signal over the clocking and control channel, said clock and control signal said clock and control signal having high and low times in units equal to one said bit time, said clock and control signal being characterized by first and second edges, said first edge having fixed phase and said second edge being phase-modulated;
    c) a processing unit operative to:
       i) extract from said clock and control signal clock information and data control information;
       ii) process said data on a basis of said clock information and said data control information for generating a data signal;
    d) an output for releasing said data signal to a data processing device.

12. A data communication system, comprising:
    a) first input means for receiving data, said data being characterized by a bit time;

b) second input means for receiving data control information;
c) encoder means coupled to said first and second input means, said encoder means operative to:
  i) generate clock information;
  ii) process said clock information and said data control information for generating a clock and control signal, said clock and control signal having high and low times in units equal to one said bit time, said clock and control signal being characterized by first and second edges, said first edge having fixed phase and said second edge being phase-modulated;
d) at least one data channel; and
e) a clocking and control channel, said encoder means operative to transmit said data over said at least one data channel and to transmit said clock and control signal over said clocking and control channel.

* * * * *